United States Patent [19]

Schumacher et al.

[11] Patent Number: 4,477,882
[45] Date of Patent: Oct. 16, 1984

[54] COMMUNICATIONS NETWORK FOR PROGRAMMABLE CONTROLLERS

[75] Inventors: Gary L. Schumacher, Mayfield Heights; Odo J. Struger, Chagrin Falls; Ronald E. Schultz, Willoughby, all of Ohio

[73] Assignee: Allen-Bradley Company, Milwaukee, Wis.

[21] Appl. No.: 352,014

[22] Filed: Feb. 24, 1982

[51] Int. Cl.³ .................. G06F 3/00; G06F 15/16
[52] U.S. Cl. .................................................. 364/900
[58] Field of Search ... 364/200 MS File, 900 MS File, 364/136, 139

[56] References Cited

U.S. PATENT DOCUMENTS

| | | | |
|---|---|---|---|
| 4,019,176 | 4/1977 | Cour et al. | 364/900 |
| 4,034,351 | 7/1977 | Takezoe | 364/200 |
| 4,195,351 | 3/1980 | Barner et al. | 364/900 |
| 4,215,396 | 7/1980 | Henry et al. | 364/136 |
| 4,319,338 | 3/1982 | Grudowski et al. | 364/900 |
| 4,354,226 | 10/1982 | Flickinger et al. | 364/200 |
| 4,363,093 | 12/1982 | Davis et al. | 364/200 |

OTHER PUBLICATIONS

*Scientific American,* Jun. 1979, "Automatic Control by Distributed Intelligence" by Stephen Kahne, Irving Lefkowitz and Charles Rose, pp. 78-90.
*Control Engineering,* Sep. 1979, "Communications and Data Highways: PC's Lead the Way" by Kenneth Pluhar, pp. 65-;68.

*Primary Examiner*—James D. Thomas
*Assistant Examiner*—Mark P. Watson
*Attorney, Agent, or Firm*—Barry E. Sammons

[57] ABSTRACT

Programmable controllers are connected in a ring by serial data links. Each controller periodically transmits information packets on the ring which contain its I/O image table data. All controllers on the ring receive such data and store it in their data tables, and such data is thus available for examination by each controller processor during its execution of the user's control program.

8 Claims, 10 Drawing Figures

COMMUNICATIONS NETWORK FOR PROGRAMMABLE CONTROLLERS

BACKGROUND OF THE INVENTION

The field of the invention is programmable controllers such as those disclosed in U.S. Pat. Nos. 4,165,534; 4,266,281; and 4,291,388.

Programmable controllers are employed in many industrial and commercial applications to control the operation of various types of machines. Programmable controllers are characterized by the repeated execution of a stored control program which contains instructions that direct the controller to examine the status of various sensing devices on the controlled machine and to operate various output devices on the controlled machine.

The size, or capacity, of a programmable controller should be compatible with the size of the machine or process being controlled. Size is typically measured by the number of I/O points the controller can support without degrading its response time to changing conditions on the controlled machine or process. In many applications this goal is met initially with a relatively small capacity programmable controller, but with the passage of time (and further automation) the capacity of the programmable controller is sometimes exceeded.

One solution to this problem is disclosed in U.S. Pat. No. 4,250,563 where the processor in a low capacity programmable controller may be easily replaced with a more powerful processor which will support additional I/O points. Another solution which is applicable to some installations is disclosed in co-pending U.S. Pat. No. 4,319,338 entitled "Industrial Communications Network With Mastership Determined By Need". The industrial communications network enables programmable controllers to be connected together through a high speed data link. Although this network has very effectively enabled programmable controllers to communicate with each other, and has thereby facilitated the addition of controllers as the control task grows, the hardware required for such communications networks is relatively expensive.

In some applications the sensing devices and operating devices on the machine or process being controlled are distributed over a wide area. In some installations it may be more desirable to employ a plurality of small programmable controllers distributed throughout the facility rather than a single large programmable controller. To implement such a distributed processing strategy, an economical means for connecting the programmable controllers into a single communications network is required.

SUMMARY OF THE INVENTION

The present invention relates to a means for interconnecting a plurality of programmable controllers to form a network which enables them to cooperatively control a machine or process. More specifically, the present invention is an improvement in a programmable controller in which an I/O image table in the programmable controller is periodically output to other similar programmable controllers through a serial output port, and I/O image table data from other programmable controllers is received through a serial input port and is stored in a data table; and wherein the control program executed by the programmable controller includes instructions which examine the state of the I/O image table and the data table.

A general object of the invention is to enable programmable controllers to be interconnected such that they cooperatively control a machine or process. By periodically transferring their I/O image tables to all other controllers in the network, each controller has up-to-date data which indicates the state of all sensing devices and output devices on the machine being controlled. Additional I/O points may thus be easily supported by adding an additional programmable controller to the network.

Another object of the invention is to minimize the hardware and software required to support the interconnection of the programmable controllers. By connecting the programmable controllers in a ring, a serial input port and a serial output port is the only hardware required to connect to the network. No collision detection or polling software is required since communications is accomplished by passing information packets around the ring.

Another object of the invention is to coordinate the network communications with the execution of the control program in each programmable controller. Each programmable controller sends a packet of I/O status information in synchronizm with its execution of the stored control program. Up-to-date I/O status data can thus be provided to the other controllers on the network with minimal impact on control program execution. On the other hand, the receipt of packets of I/O status information from other controllers on the network is an asynchronous event. Such received data is stored in the data table with minimal interruption of the control program execution, and the data is forwarded to the next controller on the ring with minimal delay.

Yet another object of the invention is to provide a means for communicating other information to processors in the network. This is accomplished by including controller identification data and command data in the information packets which are transmitted on the network. The command data is decoded by each controller when it receives the packet, and functions other than the transfer of I/O status data may thus be initiated. Such functions may include network initialization and control program editing. In addition, by decoding the controller identification data in each packet the integrity of the network and the activity of all controllers on the network can be monitored.

Another object of the invention is to provide a network in which an "intelligent" processor such as a computer or program loader may be easily added. Such a processor is inserted into the ring to receive all information packets and pass them on and to generate information packets which control the operation of the network.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
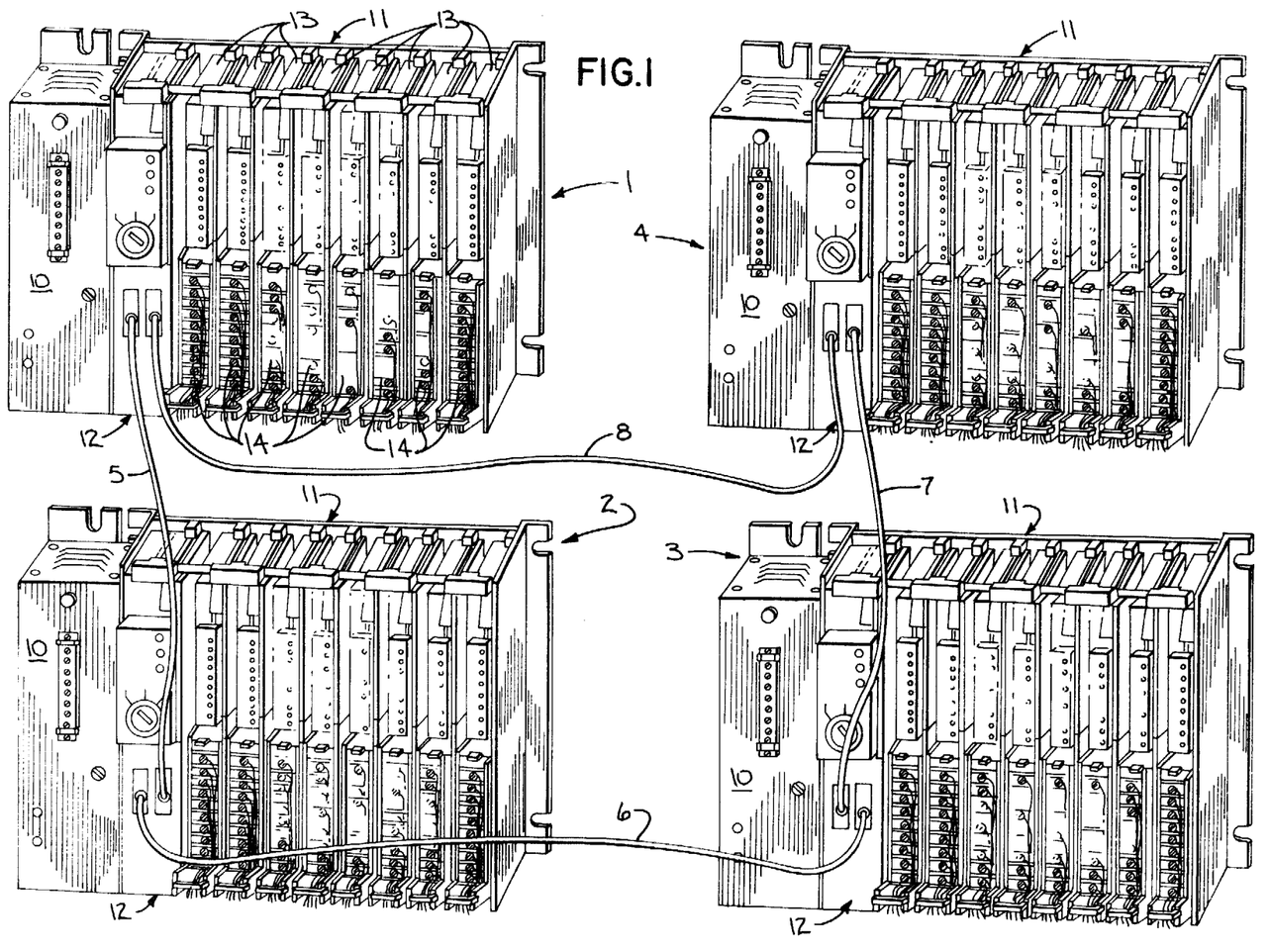
FIG. 1 is a perspective view of four programmable controllers connected in a communication ring according to the present invention.

Referring particularly to FIG. 1, four programmable controllers 1–4 are shown connected in a ring configuration by four cables 5–8. The programmable controllers 1–4 are essentially identical for the purpose of the present invention, and the detailed description of the programmable controller which follows applies equally to all controllers 1–4 in the ring. Although four programmable controllers are shown in the ring of FIG. 1, the present invention can be employed with a ring containing two or more programmable controllers. In the preferred embodiment described herein, an upper limit in ring size of eight programmable controllers is contemplated.

Referring still to FIG. 1, each programmable controller includes a power supply 10 which mounts to the side of a card rack 11. The card rack 11 contains a processor module 12 and a set of separate I/O modules 13. The number and type of I/O modules 13 will vary depending on the particular application, but each includes a connector 14 having terminals which connect to wires leading to sensing devices and operating devices on the machine being controlled (not shown in the drawings). For a detailed description of the mechanical structure of each programmable controller 1–4, reference is made to U.S. Pat. No. 4,151,580 entitled "Circuit Board Assembly with Disconnect Arm".

Figure 2:
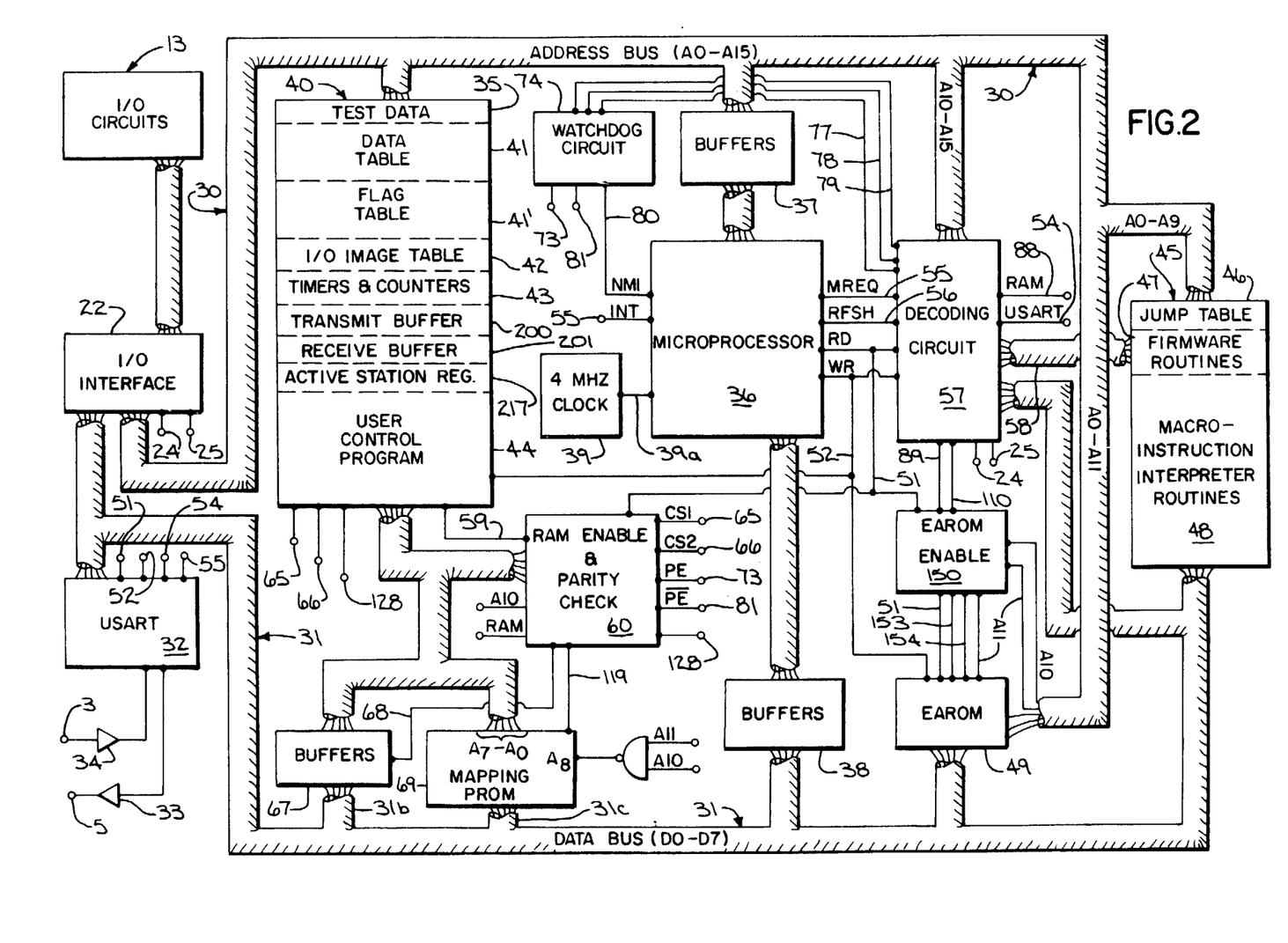
FIG. 2 is a block diagram of a programmable controller which is employed in the system of FIG. 1 and which incorporates the present invention.

Referring particularly to FIG. 2, the operation of the processor module 12 is directed by a microprocessor 36 which is coupled to an address bus 30 through a set of buffers 37 and which is coupled to a data bus 31 through a set of bidirectional buffers 38. The microprocessor 36, which in this embodiment is a model Z-80A microprocessor manufactured by Zilog, Inc., is driven through a clock line 39a by a four-megahertz clock circuit 39. Reference is made to the Z80-CPU Technical Manual published in 1976 by Zilog, Inc., for further information on the architecture, the operation and the instruction set for this microprocessor 36.

The address bus 30 and the data bus 31 connect the microprocessor 36 to three memories. The first of these is a random-access memory (RAM) 40 which stores some test location data 35, a data table 41, a flag table 41' an I/O image table 42, a table of preset and accumulated values of timers and counters 43 and a user control program 44. The RAM 40 can store 2K bytes of data in separately addressable lines with an added parity bit in each line. The second of these memories is a 4K-byte read-only memory (ROM) 45. It stores a table of jump statements 46, a first group of microprocessor instructions organized in firmware routines 47 and a second group of microprocessor instructions organized in macro-instruction interpreter routines 48.

The third memory is a 2K-byte electrically alterable read-only memory (EAROM) 49 which serves as an archive for data stored in the RAM 40, to protect against its loss. This data includes the data table 41, which is comprised of copies of the I/O image table data from the other programmable controllers in the ring. It also includes the I/O image table 42 which depicts the status of the sensing devices and the status of the operating devices directly connected to the I/O modules 13 of this programmable controller. The control program 44 contains macro-instructions which perform such functions as examining the state of particular bits in the I/O image table 42 and the data table 41, and setting output status bits in the I/O image table 42 according to the logic of such instructions.

The microprocessor 36 is programmed to repeatedly execute the control program 44, execute an I/O scan, and perform network communications functions. The I/O scan operates to input status data from the I/O circuits 13 through an I/O interface circuit 22 and to store this status in the input portion of the I/O image table 42. The I/O scan also operates to write the output portion of the I/O image table 42 to the I/O circuits 13. In this manner the status of the I/O image table 42 is updated with current information from sensing devices on the machines being controlled, and all operating devices on the controlled machine are driven to the current state of the output portion of the table 42.

The network communications functions are performed with a universal asynchronous/synchronous receiver/transmitter (USART) 32. The serial output port on the USART 32 connects to a bus driver 33 which connects to the cable 5 and the USART's serial input port is driven by a bus receiver 34 which connects to the cable 8. The USART 32 is enabled through a control line 54 and a byte of input data is read from it when a RD control line 51 is active. Data is output through the enabled USART 32 when a WR control line 52 becomes active. As will become apparent from the description below, message data is received asynchronously from other programmable controllers in the ring. When a byte of such data is received through the cable 8, the USART 32 generates a logic low signal on an INT control line 55. This generates an interrupt which vectors the microprocessor 36 to execute an interrupt service routine which is stored in the ROM 45.

The microprocessor 36 controls the coupling of data to the RAM 40, the ROM 45 and the EAROM 49 through the read and write control lines 51 and 52 and lines A10–A15 of the address bus 30. These lines and a memory request (MREQ) line 55 and a refresh (RFSH) line 56 are connected to a decoding circuit 57. The ROM 45 is connected to the decoding circuit 57 through a four-line ROM enable bus 58. Data is read from the ROM 45 by generating an address on lines A0–A11 of the address bus 30. Line A0–A9 actually specify the address, while lines A11 and A10 are decoded by the decoding circuit 57 to enable a line in the ROM enable bus 58.

The RAM 40 is also connected to line A0–A9 of the address bus 30. The RAM 40 is a 2K by nine-bit memory, with eight data bits and one parity bit stored on each of its lines. The stored parity is read out on a parity bit output line 59 to a RAM enable and parity checking circuit 60 as data is read from the RAM 40. The RAM enable and parity checking circuit 60 is connected to the data bus 31 to receive data read from the RAM 40, and it calculates the parity of this data and compares it to the stored parity received on the parity bit output line 59. The RAM enable and parity checking circuit 60 is connected through a parity error (PE) line 73 and a parity error complement (PE) line 81 to a watchdog timer circuit 74 to signal a parity error.

The RAM enable function is controlled by the microprocessor 36 through the A10 address line and the read line 51, which connect the microprocessor 36 to the RAM enable and parity checking circuit 60. The RAM 40 is enabled through two chip select (CS1 and CS2) lines 65 and 66 which connect the RAM enable and parity checking circuit 60 to the RAM 40. Through each chip select line 65 and 66, a 1K by nine-bit block of the RAM 40 is enabled for read and write operations.

Data is written to an addressed line of the RAM 40 through a set of input buffers 67 connected in a one-way input branch 31b of the data bus. The input buffers 67 are enabled through a buffer enable line 68 which is driven by the RAM enable and parity checking circuit 60.

Data is read from an addressed line of the RAM 40 through a mapping PROM 69 in an output branch 31c of the data bus 31. The mapping PROM 69 is a mask-programmable read-only memory. Each macro-instruction in the control program specifies an operation, e.g., XIC, XIO, and an eight-bit operand address. The operand address specifies a location in the tables 41–43 of the RAM 40 that contains the data upon which the operation is to be performed. The operation codes in each control program instruction is mapped to a corresponding macroinstruction interpreter routine stored in the ROM 45, and it is the function of the mapping PROM 69 to assist in this process. For a more detailed description of its operation, reference is made to U.S. Pat. No. 4,291,388.

Figure 3:
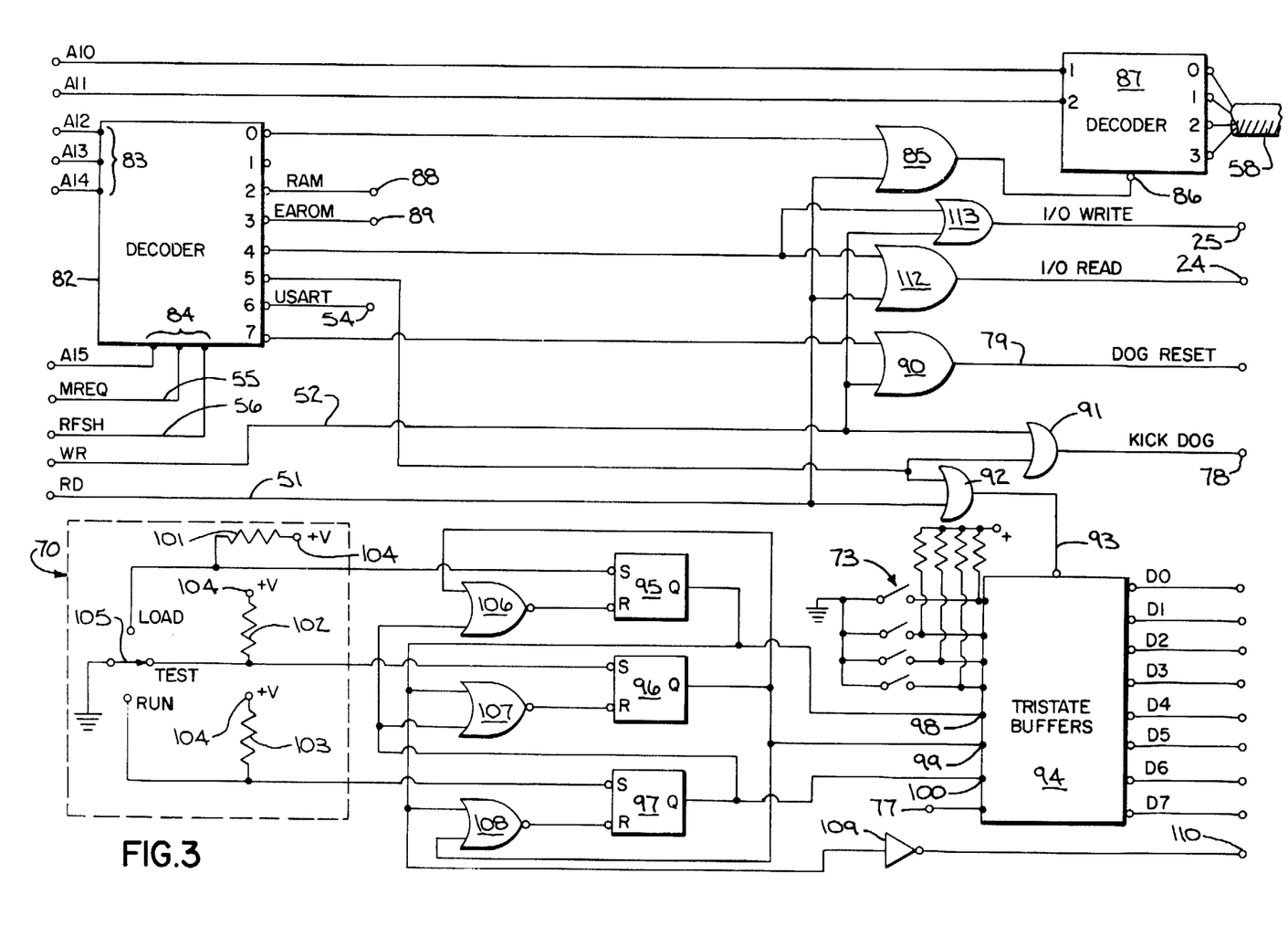
FIG. 3 is a schematic diagram of a decoding circuit shown in FIG. 2.

The decoding circuit 57 can be addressed through lines A10–A15 of the address bus 30 to enable various elements in the programmable controller. Referring particularly to FIG. 3, the decoding circuit 57 includes a three-line-to-eight-line decoder 82 having address lines A12, A13 and A14 connected to three inputs 83 and having the A15 address line, the memory request line 55, and the refresh line 56 connected to three enable inputs 84. A "0" output on the decoder 82 and the read line 51 are connected to the inputs on an OR gate 95, and this OR gate 85 is connected to an enable input 86 on a two-line-to-four-line decoder 87. The decoder 87 has four outputs which drive the ROM enable bus 58 in response to the signals on the A10 and A11 address lines.

A RAM enable line 88, an EAROM enable line 89 and the USART enable line 54, are connected to the "2", "3" and "6" outputs on the decoder 82, and the "7" output and the write line 52 are coupled through an OR gate 90 to the dog reset line 79. The "4" output on the decoder 82 connects to one input on each OR gate 112 and 113. The OR gate 112 is also connected to the RD control line 51, and the gate 112 drives a control line 24 which enables data to be input from the I/O circuits 13 through the I/O interface circuit 22. Similarly, the OR gate 113 connects to the WR control line 52 and it drives a control line 25 which enables data to be output to the I/O circuits 13. The "5" output on the decoder 82 and the write line 52 are coupled through one OR gate 91 to the kick dog line 78, and the "5" output and the RD control line 51 are coupled through another OR gate 92 to a buffer enable line 93. The buffer enable line 92 is connected to a set of buffers 94 which are enabled when a status port is addressed through lines A12–A14 of the address bus 30. An address of 5,000 (hexadecimal) will enable the buffers 94, so that the status of circuits connected to its inputs can be read.

A mode switch 70 is connected through three flip-flops 95–97 to three inputs 98–100 on the buffers 94. The mode switch 70 includes three stationary contacts associated with the LOAD, TEST and RUN modes, respectively, which are pulled high through pull-up resistors 101–103 by a d-c voltage source 104. A grounded, movable contact 105 pulls the line connected to one of the stationary contacts to a logic low level. In FIG. 3, the line connected to the TEST contact is pulled low. The LOAD, TEST and RUN switch contacts are connected to the S (set) terminals on the three flip-flops 95–97. The Q outputs of these flip-flops 95–97 are connected through NOR gates 106–108 to R (reset) terminals on each other pair of flip-flops 95–97.

The setting of the mode switch 70 in the TEST mode generates a logic high signal at the Q output of the flip-flop 96, while logic low signals are maintained at the Q outputs of flip-flops 95 and 97. If the movable contact 105 were to be switched to the LOAD position, the Q output on flip-flop 95 would switch to a logic high level, and this signal would be returned through the NOR gate 107 to reset the TEST flip-flop 96. Furthermore, the logic high signal would be coupled through an inverter 109 to produce a logic low signal on a LOMO line 110.

Also connected to four inputs of the tristate buffers 94 is a four pole station number switch 73. As indicated above, up to eight programmable controllers can be connected in the communications ring. By setting the poles of the switch 73 to the proper binary bit pattern, each programmable controller is assigned a separate station number from one to eight. As will become apparent from the description below, it is this station number which is employed to identify the source of message data placed on the communications ring and it is this station number which is used to determine if the programmable controller is the recipient, or destination, of a message on the communications ring. When all four poles of the switch 73 are open, the programmable controller is operated in a stand-alone mode.

Referring to FIG. 2, the operation of the EAROM 49 is controlled by an EAROM enable circuit 150, which has inputs connected to the read line 51, the EAROM enable line 89, the LOMO line 110 and the address lines A10 and A11. The write line 52 and lines A0–A9 of the address bus 30 are connected directly to the EAROM 49, while the A11 address line, the read line 51 and two chip enable lines (CE1 and CE2) 153 and 154 connect the EAROM enable circuit 150 to the EAROM 49.

Figure 4:
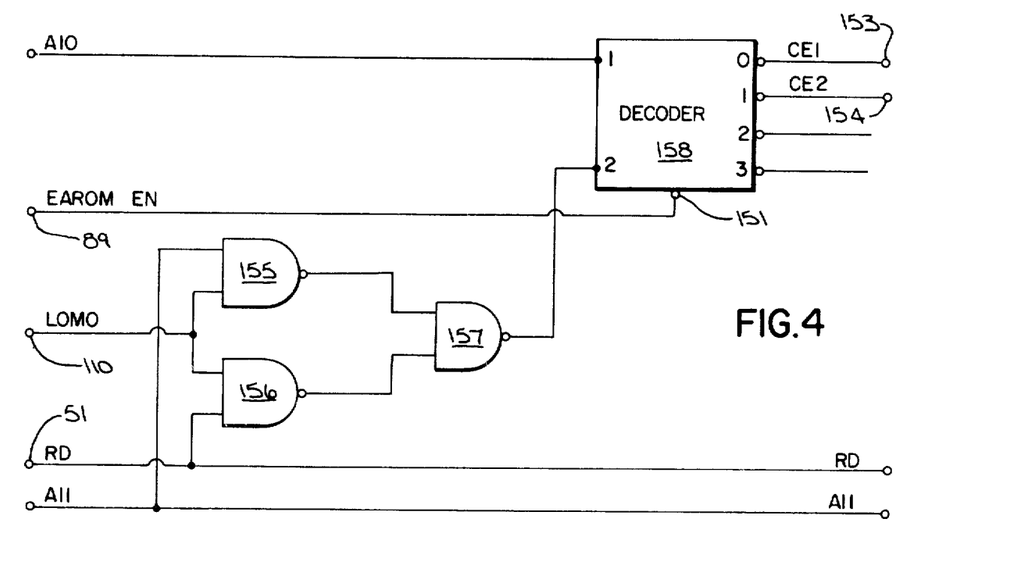
FIG. 4 is an electrical schematic diagram of an EAROM enable/disable circuit shown in FIG. 2.

Referring particularly to FIG. 4, the EAROM enable circuit 150 includes two NAND gates 155 and 156 with their outputs coupled through a NAND gate 157 to a "2" input terminal on a two-line-to-four-line decoder 158. The LOMO line 110 is connected to one input on each NAND gate 155 and 156; and the A11 address line is connected to the other input on the other NAND gate 155. The A10 address line is connected to the "1" input on the decoder 158 and the EAROM enable line 89 is connected to an enable input 151. The two EAROM chip enable (CE1 and CE2) lines 153 and 154 are connected to the "0" and "1" outputs of the decoder 158.

Two 1K by eight-bit blocks of the EAROM 49 are alternately enabled through the CE1 and CE2 lines 153 and 154. The selection of one of these lines is controlled by the logic signal on the A10 address line, provided that the outputs of the decoder 158 are enabled through the EAROM enable line 89. To protect the EAROM 49 from spurious overwriting, the EAROM 49 is disabled for writing and erasing except when the mode switch 70 (FIG. 3) is set for operation in the LOAD mode. When a logic high signal is present on the LOMO line 110, the chip enable lines 153 and 154 will disable the EAROM for writing and erasing, although data can still be read from the EAROM 49. The address line A11 and the RD control line 51 provide an erase function for the EAROM 49 in response to logic high voltage signals. The EAROM 49 is prevented from receiving these signals, however, unless the mode switch is in the LOAD mode, as signalled through the LOMO line 110.

Referring again to FIG. 2, the watchdog circuit 74 operates in combination with the ram enable and parity check circuit 60 to monitor the operation of the programmable controller. The operation of the watchdog circuit 74 and any resulting error indications are communicated through control lines 77–79 to the decoding circuit 57. For a detailed description of the watchdog circuit 74 and the parity check circuit 60, reference is made to U.S. Pat. No. 4,291,388.

The microprocessor 36 is operated in response to timing signals received from the clock 39 to read and execute instructions in the firmware routines 47 stored in the ROM 45. The microprocessor 36 repeatedly executes a FETCH routine stored in the ROM 45 to read macro-instructions (including both an operation code and an operand address) from the RAM 40. As explained previously, the two bytes in the macroinstruction are read out through the mapping PROM 69 and the data bus 31 to the microprocessor 36. The FETCH routine used in obtaining the macro-instructions is listed in Table 1 below.

TABLE 1

| Instruction Mnemonic | Comment |
|---|---|
| POP HL | Get next instruction; store the operand address in the L register and store the operation code in the H register. |
| LD E,L | Load operand address (the low byte of the macro-instruction) into the E register. |
| LD L,H | Form the address in HL which |
| LD H,C | specifies a location in a jump table 46 in the ROM 45. |
| JP (HL) | Jump indirect via the jump table 46 in the ROM 45. |

The microprocessor 36 makes use of a number of internal registers in executing the FETCH routine, which will become apparent by reference to the Z80-CPU Technical Manual, referred to above. These registers include:

PC, a sixteen-bit program counter;
SP, a sixteen-bit stack pointer;
B and C, eight-bit registers arranged as a pair;
D and E, eight-bit registers arranged as a pair; and
H and L, eight-bit registers arranged as a pair.

The program counter PC stores the memory address of the current machine instruction to be read from the ROM 45. While this instruction is being read from the ROM 45 the program counter PC is incremented for addressing the next line of the ROM 45. The stack pointer SP stores the memory address of the programmable controller-type macroinstruction to be read from the RAM 40. As each macroinstruction is fetched, the stack pointer SP in incremented two counts to address the next controller instruction, and when the END is reached, the stack pointer is initialized to point at the first macroinstruction in the control program. The control program 44 is thus continuously and repeatedly executed.

The translated operation code that is read from the mapping PROM 69 as part of each control program macroinstruction is, in fact, an address in the jump table 46 in the ROM 45. Each macroinstruction must be linked with one of the interpreter routines 48 in the ROM 45. This is done via the jump table 46 which contains instructions to jump to the address of a first instruction in a corresponding interpreter routine 48. When the microprocessor 36 executes the operation code of each macroinstruction, it jumps to the first instruction in one of the interpreter routines 48 in the ROM 45. The last portion of each interpreter routine includes the FETCH routine, which is executed to fetch the next control program macroinstruction.

A typical macroinstruction interpreter routine for XIC2 is given below in Table 2. This interpreter routine 48 examines bit 2 of an input status byte in the I/O image table 41. This bit represents the status of some sensing device on the machine being controlled.

TABLE 2

| Instruction Mnemonic | Comment |
|---|---|
| LD A,(DE) | Load operand in the A register. |
| BIT 2,A | Test the specified bit. |
| JR NZ,FETCH | Return to fetch next macro-instruction if bit 2 = 1 (which represents closed contacts). |
| RES O,B | Reset rung status if bit 2 = 0 (representing open contacts). |

Figure 5:
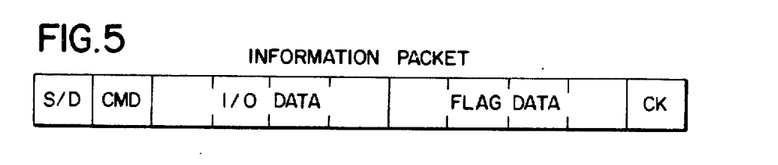
FIG. 5 is a schematic representation of the information packet format employed in the system of FIG. 1.

FETCH:

Referring particularly to FIGS. 1 and 5, the communications network is a simple unidirectional ring which requires that each programmable controller processor 12 store and forward all messages, or information packets, it receives. Each information packet is comprised of eleven bytes of information, the first byte providing a 4-bit code which identifies the source of the packet and a 4-bit code which identifies the destination of the packet. When the destination code is the same as the source code, a "global" information packet directed to all programmable controllers in the ring is defined.

A command byte is included in each information packet and it is employed primarily when a programming terminal or other intelligent processor is inserted in the ring. During normal operation, however, a "background" command byte is employed to transmit I/O data and flag data between the programmable controllers. Other commands include initialization commands which will be described in detail below, and still other commands may be employed by programming terminals such as that disclosed in co-pending U.S. patent application Ser. No. 490,740 filed May 9, 1983 which is a continuation of abandoned application Ser. No. 186,254 filed Sept. 11, 1980, to change the mode of operation of programmable controllers in the ring and to load and edit their control programs.

The four bytes of I/O data in a background information packet represent the current state of the I/O image table 42 in the source programmable controller. The four bytes of accompanying flag data is user defined information which is transmitted to all controllers in the ring. It should be apparent that the number of bytes required to transfer the I/O image table 42 may be varied to accommodate controllers of different sizes. In addition, large I/O image tables may be transferred in segments, with one data byte being used as an index that indicates which I/O image table segment is being transferred. Such variations from the format shown in FIG. 5 may be indicated by an appropriate command byte.

As will now be explained in more detail, each programmable controller in the ring operates to periodically generate a global background command which transfers the current state of its I/O image table 42 to the data tables 41 in each of the other programmable controllers. Conversely, each programmable controller in the ring also receives information packets on the ring which must be processed. When in the RUN mode, such processing includes transmitting the information packet to the next controller in the ring and directing the I/O data in the packet to the proper portion of the controller's data table 41.

Figure 7A:
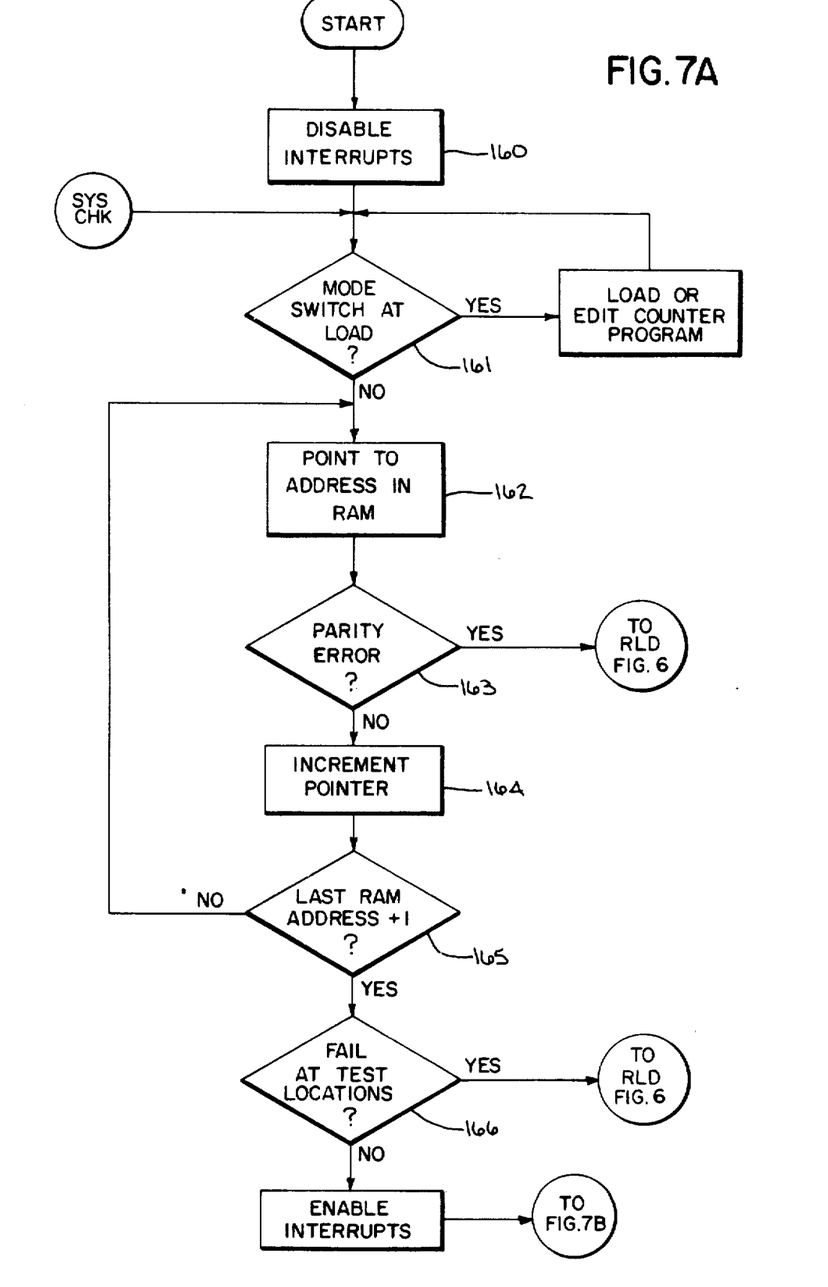
FIG. 7a and FIG. 7b are a flow chart of an INITIALIZATION routine stored in the ROM in FIG. 2.

Referring particularly to FIG. 7A, when the programmable controller is powered up it executes an initialization routine which checks the integrity of the data in its RAM 40 and checks the integrity of the communications ring. The microprocessor 36 first disables both maskable and nonmaskable interrupts as represented by process block 160. The microprocessor 36 then enters a system check (SYS CHK) portion of the INITIALIZATION routine in which the mode switch 70 is examined as seen in decision block 161 to determine whether it is in the LOAD mode. If the mode switch 70 is set in the LOAD mode, the microprocessor 36 branches to load or edit the control program. If the mode switch 70 is not set in the LOAD mode, the microprocessor 36 loads the starting address of the RAM 40 in the HL register pair as represented in process block 162. It then reads the data from the RAM 40 and reads the status port in the decoding circuit 57 to check for a parity error. If a parity error is detected in the RAM data, the microprocessor 36 branches at decision block 163 to a RELOAD routine, otherwise, the register pair HL is incremented, as represented in process block 164 to address the next RAM location. As shown in decision block 165, this address is tested to determine whether it is greater than the last address in the RAM 40, and if not, the microprocessor 36 loops back to process block 162 to test the parity of the data in the next RAM address. When all of the RAM data has been checked, the microprocessor 36 checks data at two RAM test locations, as shown in decision block 166. If this test fails, the microprocessor 36 again branches to the RELOAD routine in FIG. 6.

Figure 6:
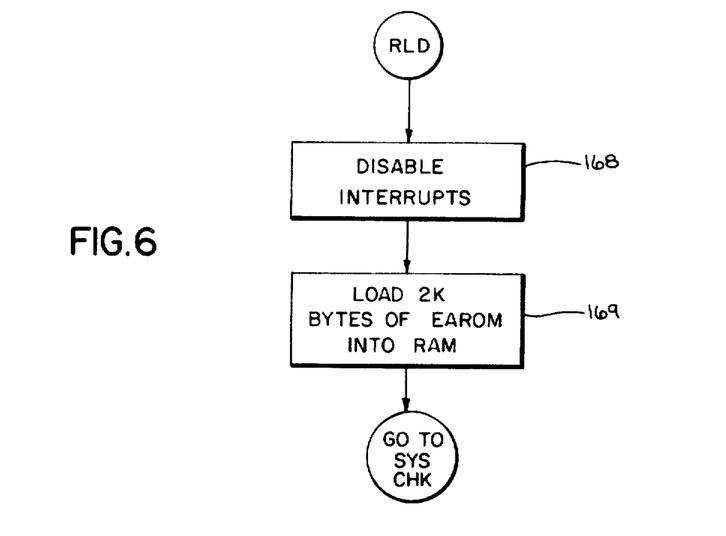
FIG. 6 is a flow chart of a RELOAD routine stored in the ROM in FIG. 2.

From this description it can be seen that during initialization the data in the RAM 40 is checked and if it is faulty a RELOAD routine is executed to reload the master copy of the data tables 41-43, test data 35 and the user control program 44 from the EAROM 49 into the RAM 40. Referring to FIG. 6, the RELOAD routine begins as seen in process block 168 with a disabling of both maskable and nonmaskable interrupts, so that data will not be lost due to an interrupt while the RAM 40 is being reloaded. Next, 2K lines of data are transferred from the EAROM 49 into the RAM 40 as shown in process block 169. The system then returns to the system check portion of the INITIALIZATION routine to recheck the data in the RAM 40. The data in the EAROM 49 is generated by copying the contents of the RAM 40 when the controller is switched from the LOAD mode of operation. The details of this process are described in U.S. Pat. No. 4,291,388.

Figure 7B:
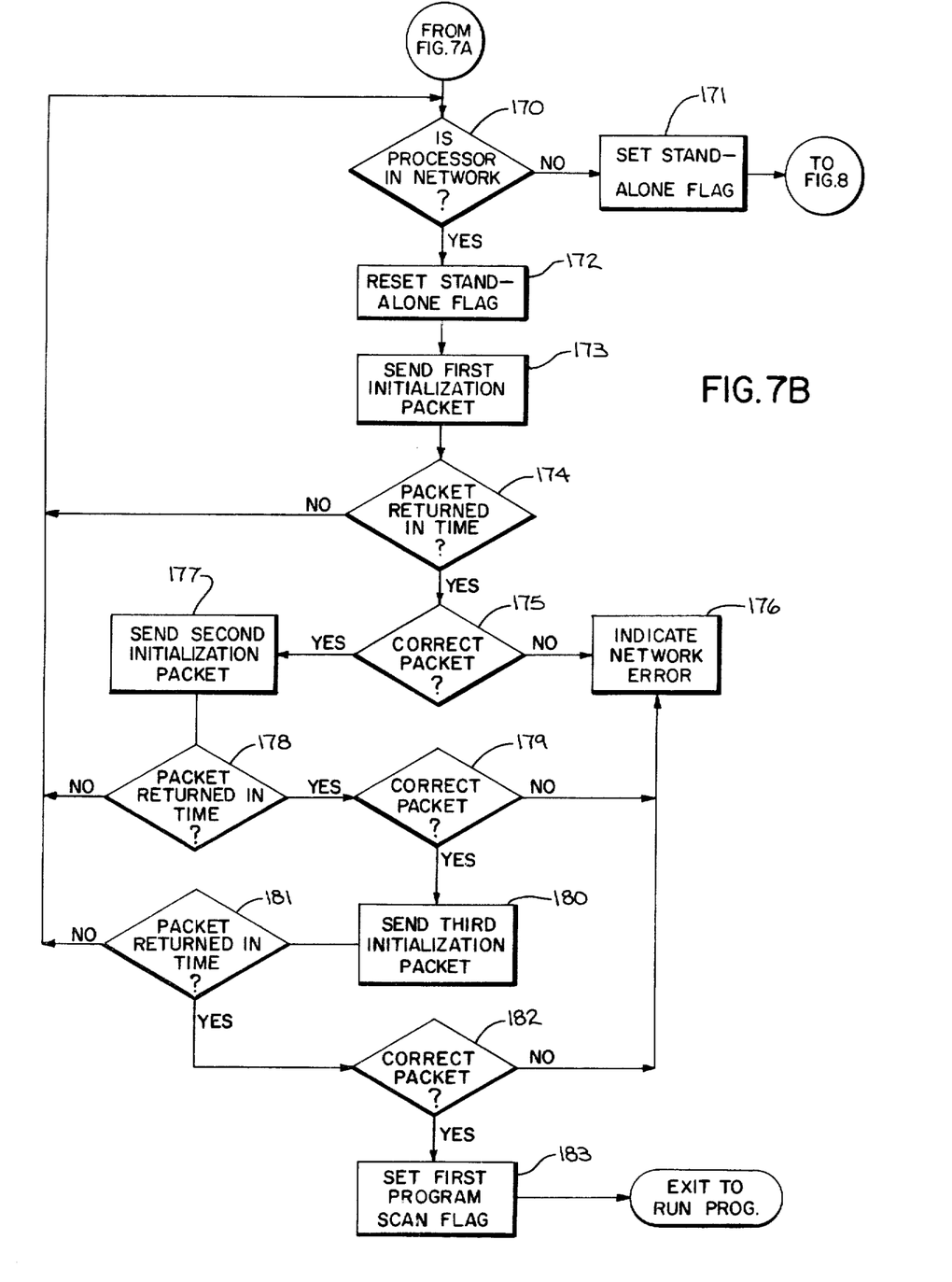

Referring particularly to FIG. 7B, after the integrity of the programmable controller's own data structures has been confirmed, the readiness and integrity of the communications ring is tested. This is accomplished by sending a series of initialization information packets on the ring.

First, however, the state of the station switches 73 are checked, as indicated by decision block 170, to determine if the controller is operating alone or is in a network. If all the switches 73 are open, the controller is operating alone and a stand alone flag is set as indicated by process block 171 before commencing operation. On the other hand, if the switches 73 indicate a station number from 0 to 7, the stand along flag is reset at process block 172 and a first initialization packet is formed and sent on the communications network as indicated at process block 173. The first initialization packet is a global message which includes a unique command byte followed by eight "blank" bytes. The blank bytes correspond to the eight possible programmable controller stations on the ring, and as the first initialization packet is received by each station, that station writes its own status register into the blank byte corresponding to its own station number. If the communications ring is operable, this first initialization packet is received back in a timely manner as detected at decision block 174 and it is examined at decision block 175. If the initialization packet is not received in a timely manner, the system loops and trys again until all controllers on the ring are properly operating. The received initialization packet is then examined to determine how many stations are on the ring and which station numbers are being used. This information is saved in the RAM 40. If another programmable controller is using the same station number, this is detected at this point and a communications network error is indicated at 176.

As indicated at process block 177, a second initialization packet is transmitted around the ring to further check its integrity. This packet is formed from the first packet, but the controller loads its own status register into the blank byte corresponding to its own station number. The command byte is also changed to indicate it is the second initialization packet. If the second initialization packet is received in a timely manner as indicated at decision block 178, the status data is compared with that which was sent to establish that there is not a duplicate station on the ring. If the packet is correct as determined at decision block 179, a final check is made by sending a third initialization packet. As indicated at process block 180, this packet is similar to the second initialization packet except the value of a selected timer is loaded into the blank byte corresponding to its own station number. If the third packet is received in a timely manner as determined at decision block 181, and if the timer value corresponds to that which was sent, as determined at decision block 182, the communication network is considered fully operable. Accordingly, a first program scan flag is set, as indicated at process block 183 and the system jumps to begin executing the control program.

Figure 8:
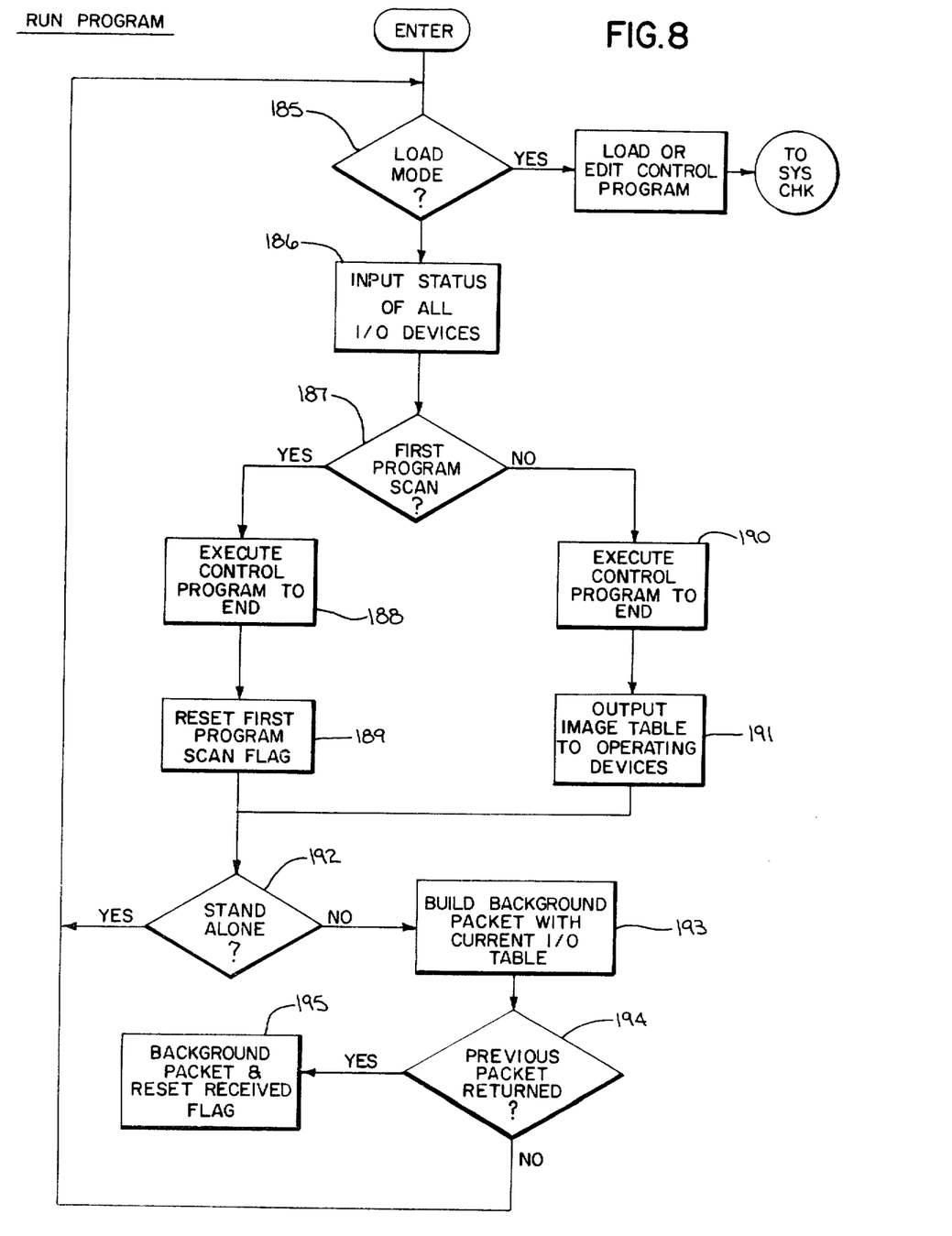
FIG. 8 is a flow chart of a RUN routine stored in the ROM in FIG. 2.

Referring particularly to FIGS. 2 and 8, before executing the control program the mode switch 70 is checked to determine if the system is in the load mode. If so, the system branches at decision block 185 to load or edit the control program. Otherwise, the status of all devices connected to the I/O circuits 13 is input and stored in the I/O image table 42 as indicated by process block 186. The first program scan flag is then checked at decision block 187 to determine if this is the first execution of the control program since being powered-up or switched from the load mode. If so, the control program is executed as indicated at process block 188 to perform a prescan in which all outputs are turned off and all jump targets are calculated. The first program scan flag is then reset as indicated at process block 189.

On subsequent scans through the control program the system branches at decision block 187 and executes the control program in normal fashion as indicated by process block 190. The macroinstructions in the control program may examine the state of any bit in the I/O image table 42 or the data table 41 to determine the status of any I/O device connected to a programmable controller in the ring. Based on the status of such examined I/O devices and the logic of the control program, bits in the output portion of the I/O image table 42 are set or reset. When the END macroinstruction is executed the system then executes instructions indicated by process block 191 which output the contents of the output portion of the I/O image table 42 to the corresponding I/O circuits 13.

Following the execution of the control program a test is made to determine if the controller is operating alone. If not, as determined at decision block 192, a background information packet is constructed using the current contents of the I/O image table 42 as indicated at process block 193. A check of a packet received flag is then made at decision block 194 to determine if the previously transmitted background packet has traveled completely around the ring. If so, the newly formed background packet is queued up in a transmit buffer in the RAM 40 and the packet received flag is reset as indicated by process block 195. The system then loops to repeat the cycle of updating the I/O image table 42, and transmitting a current background packet on the communications ring. Only one background packet for each controller station is in transit at any point in time, and when each packet is received back at its originating station, a new background packet containing the most recent version of the station's I/O image table is placed on the ring. The data table 41 in each controller is thus kept up to date.

It should be apparent that the above-described programs are executed continuously to perform the indicated functions. Superimposed on these "background" programs is a "foreground" program which is executed each time an interrupt is generated by the USART 32. Such an interrupt is generated each time an 8-bit byte is received by the USART 32 and each time the USART 32 has completed the transmission of an 8-bit byte. Associated with the USART 32 is a transmit buffer 200 which is formed in the RAM 40 and which stores information packets awaiting transmission. Similarly, a receive buffer 201 is formed in the RAM 40 and it serves to store successive bytes of information packets as they are received by the USART 32. Next-in and next-out pointers are associated with each buffer 200 and 201, and these indicate the locations at which further data may be loaded into the buffers and the location of the next byte of data to be read from the buffers.

Figure 9:
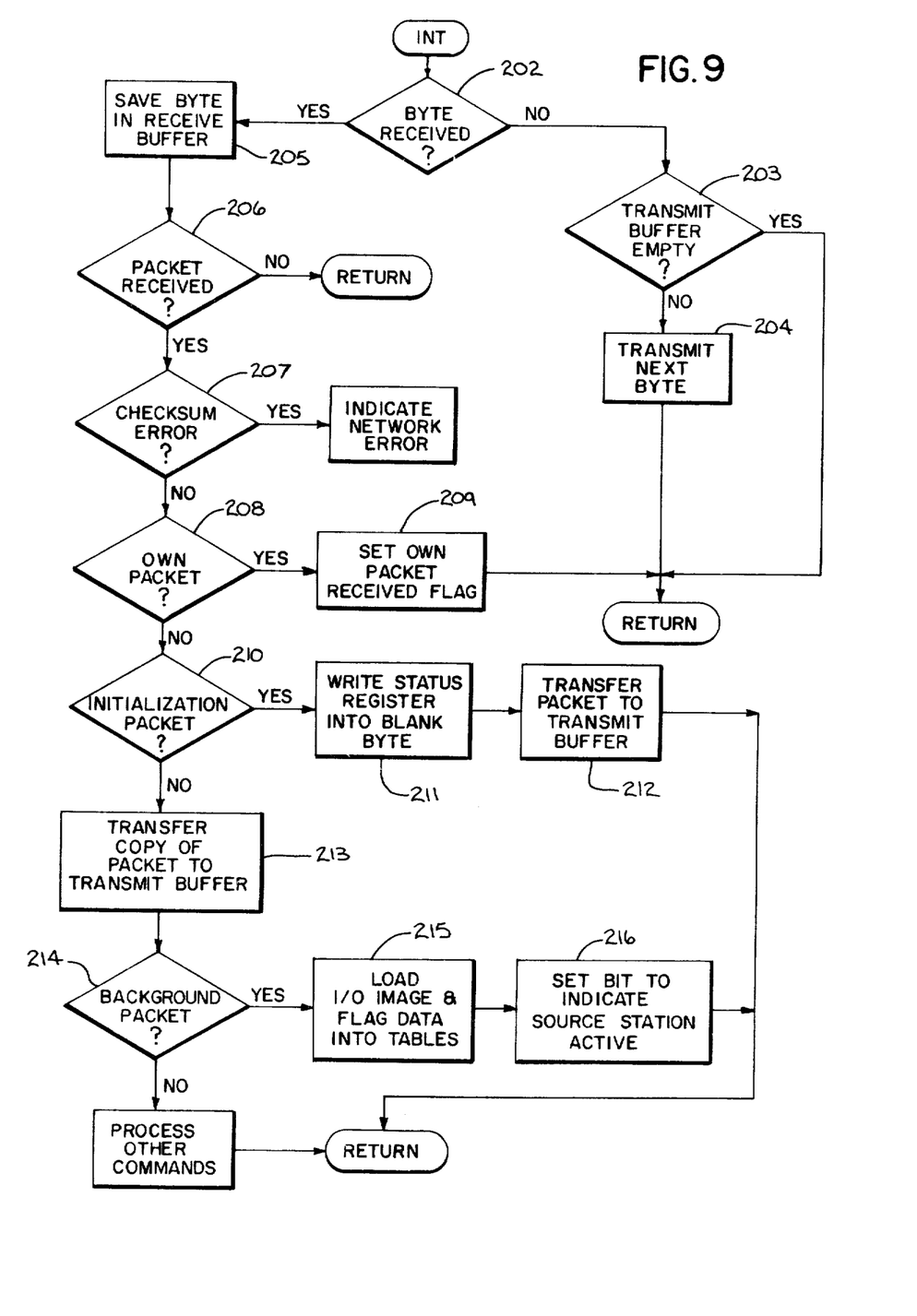
FIG. 9 is a flow chart of an INTERRUPT SERVICE routine stored in the ROM in FIG. 2.

Referring particularly to FIGS. 2 and 9, when a USART interrupt is generated the interrupt service routine first executes instructions indicated by decision block 202 to determine if the interrupt occurred as a result of a received byte of data. If not, the interrupt was generated by the USART transmitter and the transmit buffer 200 is checked to determine if further data is queued up for transmission. If not, as determined at decision block 203, the system returns to the background programs. Otherwise, the next byte in the transmit buffer 200 is written to the USART 32 for transmission before returning to the background programs. This is indicated at process block 204.

When a byte of data is received by the USART 32, it is loaded into the receive buffer 201 as indicated by process block 205. If the received byte is a checksum byte, a complete information packet has been received and can be processed. Otherwise, as indicated at decision block 206, the system returns to the background programs. The information packet is processed by instructions which examine the checksum byte to determine if a transmission error has occurred, and which examine the source field to determine if the packet originated at this controller. If a checksum error is detected, the system branches at 207 to indicate a network error. If the information packet originated at this controller, the system branches at 208 and the "packet received" flag is set at process block 209 before returning to the background programs.

Referring still to FIG. 9, if the received information packet originated at another controller station, the command byte is examined to determine how the packet is to be processed. As shown at decision block 210, if the packet is an initialization packet, the contents of the microprocessor's status register is inserted into the packet. As indicated by process block 211, this is accomplished by writing over the blank byte in the packet which corresponds to the station number of this programmable controller. The modified initialization packet is then transferred to the transmit buffer 200 as indicated by process block 212.

If the received packet is not an initialization packet, it is transmitted without change to the next controller in the ring without further delay. This is accomplished by transferring a copy of the packet to the transmit buffer 200 as indicated by process block 213. Following this the command byte is examined to determine if the packet is a background packet. If not as indicated at decision block 214, the system branches to determine the nature of the command and to process the command. The manner in which these other commands are processed is not particularly pertinent to the present invention and this processing is indicated collectively by the single process block 215. On the other hand, when a background information packet is received, the eight bytes of I/O image data are extracted from the packet and written to the data table 41. The source code in the packet indicates which of the seven segments in the data table 41 is to receive the I/O data. As indicated by process block 215, the same process is repeated for the eight bytes of flag data which is written into the appropriate segment of the flag table 41. And finally, as indicated by process block 216, a bit corresponding to the source station number is set in an active station register 217. This register 217 is stored in the RAM 40 and it is available for testing by the user's control program to establish which stations on the ring are operable and have transmitted updated I/O status data.

It should be apparent from the above description that there are two important design goals for the interrupt service routine. First, those information packets which are to be relayed by the controller station should be identified and transmitted as soon as possible. This insures that the packet is conveyed around the ring to all controllers as rapidly as possible. Secondly, the amount of processing time required by the interrupt service routine should be minimized. Since this routine may be entered often during each scan through the control program, it does significantly affect the total scan time of the programmable controller. In the preferred embodiment described herein, this burden is dependent upon the number of active stations on the ring and is the lesser of 35% of the total scan time or 1.4 milliseconds times the number of active stations.

Appendix A
COMPONENT APPENDIX

| Component | Reference Number | Description |
|---|---|---|
| Microprocessor | 36 | Z-80A CPU manufactured by Zilog |
| RAM | 40 | Four 2114 1024 X 4-bit random-access memories manufactured by Intel Corporation and two 2102 1024 X 1-bit random-access memories manufactured by Intel Corporation |
| ROM | 45 | Four 82S181 1K X 8-bit programmable read-only memories manufactured by Signetics |
| EAROM | 49 | Four 3400 1K X 4-bit electrically alterable read-only memories manufactured by General Instruments, Inc. |
| Mapping PROM | 69 | SN74S472 512-line X 8-bit programmable read-only memory manufactured by Texas Instruments, Inc. |
| 3-line-to-8-line | 82 | SN74LS138 3-to 8-line decoder decoder manufactured by Texas Instruments, Inc. |
| 2-line-to-4-line decoder | 87, 158 | Two SN74LS139 dual 2-to 4-line decoder manufactured by Texas Instruments, Inc. |
| Buffers | 37, 94 | Two SN74LS244 octal buffers and line drivers manufactured by Texas Instruments, Inc. |
| Bidirectional | 38 | 8304 Octal bidirectional buffers/line drivers manufactured by National Semiconductor, Inc. |
| Flip-flops | 95-97 | SN74LS279 quad S-R latches manufactured by Texas Instruments, Inc. |
| NOR gates | 106-108 | SN24L02 quad 2-input positive NOR gates manufactured by Texas Instruments, Inc. |
| OR gates | 85, 90-92, 112 | Two SN74LS32 quad 2-input positive OR gates manufactured by Texas Instruments, Inc. |
| NAND gates | 155, 156 157 | SN74LS132 quad 2-input positive NAND gates manufactured by Texas Instruments, Inc. |
| NAND gate | 125 | SN74LS00 quad 2-input positive NAND gates manufactured by Texas Instruments, Inc. |
| NAND gate | 137 | SN7401 quad 2-input open-collector NAND gates manufactured by Texas Instruments, |

Appendix A
COMPONENT APPENDIX
-continued

| Component | Reference Number | Description |
|---|---|---|
| Inverters | 140, 143 144 and 146 | Inc. SN7406 hex inverters with open collectors manufactured by Texas Instruments, Inc. |
| Inverters | 145 | SN74LS14 hex Schitt-trigger inverters manufactured by Texas Instruments, Inc. |
| Inverters | 109 | SN7404 hex inverters manufactured by Texas Instruments, Inc. |
| Gate | 114 | SN74125 quad bus buffer gates manufactured by Texas Instruments, Inc. |

We claim:

1. A programmable controller for connection to other programmable controllers in a network through a serial data link, the programmable controller comprising:

a processor for repeatedly executing a stored control program to examine the state of sensing devices connected to the programmable controller and to operate output devices connected to the programmable controller;

I/O image table means coupled to the processor for storing data indicative of the state of all sensing devices and output devices connected to the programmable controller;

data table storage means coupled to the processor for storing I/O image table data from each of the other programmable controllers in the network;

transmit means coupled to the processor and the I/O image table means for periodically sending the stored I/O image table data through said serial data link to other programmable controllers in the network;

receive means coupled to the serial data link for receiving I/O image table data from other programmable controllers in the network, the receive means being operable to momentarily interrupt the execution of the control program by said processor and to store the received I/O image table data in said data table; and wherein the processor is operable during the execution of the control program to examine the state of the data table and to thereby determine the state of sensing devices and output devices connected to other programmable controllers in the network.

2. The programmable controller as recited in claim 1 in which the programmable controllers in the network are connected in a ring, in which the receive means in the programmble controller is operable to couple the I/O image table data received from other programmable controllers to the transmit means, and the transmit means is operable to transmit such data to the next programmable controller in the ring.

3. The programmable controller as recited in claim 2 in which the I/O image table data is transmitted on the ring as a packet comprised of a plurality of data bytes, and in which one of the bytes in each such packet identifies the programmable controller from which the packet originated.

4. The programmable controller as recited in claim 1 in which the transmit means is enabled each time the processor executes the control program.

5. A programmable controller for connection to other programmable controllers in a ring communications network, the combination comprising:
   a serial input port for receiving packets of data from another programmable controller in the ring;
   a serial output port for transmitting packets to another programmable controller in the ring;
   a memory for storing data which includes a control program, an I/O image table, a data table, and a transmit buffer;
   a processor coupled to said memory and being operable to execute instructions in the control program which direct the processor to examine the state of the I/O image table and the data table;
   receive means coupled to the memory and the serial input port and being responsive to the receipt of a packet of data at the serial input port from another programmable controller in the ring to store data contained in the packet in the data table portion of the memory, and to store the packet of data in the transmit buffer portion of the memory;
   packet forming means coupled to the memory for periodically forming a packet of data and writing it to the transmit buffer, which packet of data is formed in part by data transferred from the I/O image table portion of the memory; and
   transmit means coupled to the memory and the serial output port and being operable to transmit packets of data stored in the transmit buffer to the next programmable controller in the ring through the serial output port.

6. The programmable controller as recited in claim 5 in which the packet forming means is operable in synchronizm with the processor's execution of the control program instructions and both the receive means and the transmit means operate asynchronously with respect to the processor's execution of the control program instructions.

7. The programmable controller as recited in claim 5 which includes means for designating a station number and the packet forming means is operable to read the designated station number and load it into each packet of data which it forms.

8. The programmble controller as recited in claim 7 in which the memory stores an active station register containing a memory location associated with each programmable controller on the ring, and the receive means is responsive to the station number data in each received packet of data to indicate in the active station register that the associated programmable controller is active.

* * * * *

UNITED STATES PATENT AND TRADEMARK OFFICE
CERTIFICATE OF CORRECTION

PATENT NO. : 4,477,882

DATED : October 16, 1984

INVENTOR(S) : Gary L. Schumacher et al

It is certified that error appears in the above-identified patent and that said Letters Patent is hereby corrected as shown below:

The title page showing the illustrative Figure should be deleted to appear as per attached title page.

United States Patent

Schumacher et al.

[11] Patent Number: 4,477,882
[45] Date of Patent: Oct. 16, 1984

[54] COMMUNICATIONS NETWORK FOR PROGRAMMABLE CONTROLLERS

[75] Inventors: Gary L. Schumacher, Mayfield Heights; Odo J. Struger, Chagrin Falls; Ronald E. Schultz, Willoughby, all of Ohio

[73] Assignee: Allen-Bradley Company, Milwaukee, Wis.

[21] Appl. No.: 352,014

[22] Filed: Feb. 24, 1982

[51] Int. Cl.³ .............. G06F 3/00; G06F 15/16
[52] U.S. Cl. ................................. 364/900
[53] Field of Search ... 364/200 MS File, 900 MS File, 364/136, 139

[56] References Cited

U.S. PATENT DOCUMENTS

| | | | |
|---|---|---|---|
| 4,019,176 | 4/1977 | Cour et al. | 364/900 |
| 4,034,351 | 7/1977 | Takezoe | 364/200 |
| 4,195,351 | 3/1980 | Barner et al. | 364/900 |
| 4,215,396 | 7/1980 | Henry et al. | 364/136 |
| 4,319,338 | 3/1982 | Grudowski et al. | 364/900 |
| 4,354,226 | 10/1982 | Flickinger et al. | 364/200 |
| 4,363,093 | 12/1982 | Davis et al. | 364/200 |

OTHER PUBLICATIONS

*Scientific American*, Jun. 1979, "Automatic Control by Distributed Intelligence" by Stephen Kahne, Irving Lefkowitz and Charles Rose, pp. 78-90.
*Control Engineering*, Sep. 1979, "Communications and Data Highways: PC's Lead the Way" by Kenneth Pluhar, pp. 65-;68.

Primary Examiner—James D. Thomas
Assistant Examiner—Mark P. Watson
Attorney, Agent, or Firm—Barry E. Sammons

[57] ABSTRACT

Programmable controllers are connected in a ring by serial data links. Each controller periodically transmits information packets on the ring which contain its I/O image table data. All controllers on the ring receive such data and store it in their data tables, and such data is thus available for examination by each controller processor during its execution of the user's control program.

8 Claims, 10 Drawing Figures

FIG.2

UNITED STATES PATENT AND TRADEMARK OFFICE
CERTIFICATE OF CORRECTION

PATENT NO. : 4,477,882            Page 3 of 3
DATED : October 16, 1984
INVENTOR(S) : Gary L. Schumacher et al It is certified that error appears in the above—identified patent and that said Letters Patent is hereby corrected as shown below:

Column 1, line 34,      "copending" should be deleted

Column 2, line 28,      "synchronizm" should be -- synchronism --

Column 4, line 65,      "Line" should be -- Lines --

Column 5, line 54,      "95" should be -- 85 --

Column 6, line 9,      "92" should be -- 93 --

Column 13, line 53,      In component column, after or below "Bidirectional" -- buffers -- should appear Column 16, line 10,      "chronizm" should be -- chronism --

Signed and Sealed this

Twenty-second Day of October 1985

[SEAL]

Attest:

DONALD J. QUIGG

Attesting Officer      Commissioner of Patents and Trademarks—Designate